(12) United States Patent
Clemm et al.

(10) Patent No.: US 8,266,088 B2
(45) Date of Patent: Sep. 11, 2012

(54) TRACKING POLICY DECISIONS IN A NETWORK

(75) Inventors: L. Alexander Clemm, Los Gatos, CA (US); Kaushik Narayan, San Jose, CA (US); Keith McCloghrie, Pawling, NY (US)

(73) Assignee: Cisco Technology, Inc., San Jose, CA (US)

( * ) Notice: Subject to any disclaimer, the term of this patent is extended or adjusted under 35 U.S.C. 154(b) by 649 days.

(21) Appl. No.: 12/481,519

(22) Filed: Jun. 9, 2009

(65) Prior Publication Data

US 2010/0312740 A1  Dec. 9, 2010

(51) Int. Cl.
*G06N 5/02* (2006.01)
*G06F 17/00* (2006.01)

(52) U.S. Cl. ............................................. 706/47; 706/59

(58) Field of Classification Search .................... 706/46, 706/59
See application file for complete search history.

(56) References Cited

U.S. PATENT DOCUMENTS

| | | | |
|---|---|---|---|
| 6,539,427 B1 * | 3/2003 | Natarajan et al. | 709/224 |
| 2003/0149787 A1 * | 8/2003 | Mangan | 709/238 |

* cited by examiner

*Primary Examiner* — Jeffrey A Gaffin
*Assistant Examiner* — Nathan Brown, Jr.
(74) *Attorney, Agent, or Firm* — Hickman Palermo Truong Becker Bingham Wong LLP (57) ABSTRACT

An apparatus is disclosed for creating and storing policy data records comprising data identifying network policy decisions. After a data packet is received, a network policy decision is made based on information in the packet and one or more network policies. A policy data record identifying the network policy decision is created, and the policy data record is stored.

19 Claims, 9 Drawing Sheets

TRACKING POLICY DECISIONS IN A NETWORK

TECHNICAL FIELD

The present disclosure generally relates to policy based network management.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Policy based networks allow for detailed control of network access and traffic flow by enabling network administrators to define policies that network devices use for decision making. Policy decisions may be made in multiple places in a network and enforced by more than one network entity. Furthermore, policy decisions may be enforced at different layers of the stack. Traffic is often subjected simultaneously to multiple policies, of multiple policy domains that are independent and unaware of each other, and enforced at multiple points in the network.

The units principally responsible for data processing in policy based networks are Policy Enforcement Points (PEPs) and Policy Decision Points (PDPs). A PEP is a logical entity that decides how to respond to a request for network resources. For example, a PEP on a data packet router may control user access to other network resources, such as a particular file server. A PDP is a logical entity that reports policy decisions to PEPs. Each PDP is often tied to a particular type of decision. For example, one PDP may make flow control decisions for a particular router interface while another PDP may make authentication decisions. Decisions made by PDPs are reported to the requesting PEP, where a final decision will be made for a particular network request. A PDP may be implemented using a general-purpose computer or using a special-purpose computer such as a network infrastructure element.

A PEP may request information from more than one PDP for a given network request in order to make a decision, and a PDP may report to more than one PEP.

DETAILED DESCRIPTION

An apparatus for tracking policy decisions in a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
    3.0 Managing Network Policy Information
        3.1 Storing Policy Data Records
        3.2 Executing Policy Decision Queries
    4.0 Implementation Mechanisms—Hardware Overview
    1.0 General Overview In an embodiment, a data processing apparatus comprises one or more processors; one or more interfaces coupled to the one or more processors; policy component logic coupled to the one or more processors and configured to inspect one or more data packets which are received from one or more of said interfaces; and make a networking policy decision based, at least in part, on one or more available policy rules; and information contained in the one or more inspected data packets; policy data collection logic coupled to the policy component logic and configured to create one or more policy data records based, at least in part, on the network policy decision; and store said policy data records in a volatile or non-volatile storage device that is coupled to the apparatus, wherein each of the policy data records comprises data identifying the networking policy decision.

In an embodiment, the policy data collection logic is configured to record, in each of the policy data records, data comprising a record type value that identifies a format of the policy data records; a policy data collection point identifier that identifies the apparatus; a policy enforcement point identifier that identifies a first component that requested and enforced the networking policy decision; a policy decision point identifier that identifies a second component that made the networking policy decision; a target type value that identifies a type of the target of the networking policy decision; a target identifier that identifies the target of the networking policy decision; a rule identifier that uniquely identifies one or more policy rules that were enforced; a verdict value that indicates a result of applying the one or more policy rules; a time stamp indicating when the policy data record was generated.

In an embodiment, the policy data collection logic is further configured to record, in each of the policy data records, a plurality of rule indicators. In an embodiment, the rule identifier comprises a transaction identifier that identifies a transaction involving a plurality of previously applied rules. In an embodiment, each of the policy detail records further comprises a condition value specifying a condition of the one or more packets that triggered the networking policy decision.

In an embodiment, each of the first component and second component is identified by a unique component identifier that comprises a type value, a scope identifier value, a capability identifier, a policy component instance identifier that uniquely identifies a particular instance of the component, and a device identifier.

In an embodiment, the apparatus further comprises query component logic coupled to the one or more processors and configured to receive, from a requester via said one or more interfaces, a policy decision query comprising a query context which comprises hypothetical network state information; policy simulation logic coupled to the query component logic and configured to make a policy decision based, at least in part, on said query context; create one or more policy data records based, at least in part, on the policy decision; return, to the requester, one or more policy data records associated with the policy decision.

In an embodiment, the policy simulation logic is configured to provide in each of the policy data records one or more of a record type value that identifies a format of the policy data records; a policy data collection point identifier that identifies the apparatus; a policy enforcement point identifier that identifies a first component that requested and enforced the networking policy decision; a policy decision point identifier that identifies a component that made the networking policy decision; a target type value that identifies a type of the target of the networking policy decision; a target identifier that identifies the target of the networking policy decision; a rule identifier that uniquely identifies one or more policy rules that were enforced; a verdict value that indicates a result of applying the one or more policy rules; or a time stamp indicating when the policy data record was generated.

In an embodiment, the policy configuration logic is further configured to determine that the policy decision query is directed to a policy enforcement point, and in response, to determine one or more policy decision points associated with the policy enforcement point; redirecting the policy decision query to each of said policy decision points; receive, as a response from each of said policy decision points, a policy data record; create a policy data record reflecting a decision based on said received policy data records; return said policy data record reflecting said decision.

In an embodiment, a data processing apparatus comprises one or more processors; one or more interfaces coupled to the one or more processors; query component logic coupled to the one or more processors and configured to receive a policy decision query comprising a query context which comprises hypothetical network state information from said one or more interfaces and to determine, based, at least in part, on said query, one or more associated policy record collection points; policy component logic coupled to the query component logic and configured to forward the query to one or more policy record collection points; policy trace logic coupled to the one or more processors and configured to receive one or more policy data records that describe one or more policy decisions based, at least in part, on said query context, performed by said one or more policy record collection points.

In an embodiment, the policy decision query is made up of one or more of a policy query target identifier that identifies one or more policy components at which the query is directed; a policy enforcement target identifier that identifies the subject on which the policy is to be enforced; a trigger value, identifying an event that may trigger a policy decision; or a query context identifying a hypothetical network state to be used for logically overriding the state of one or more network devices.

In an embodiment, the policy trace logic is configured to determine each network device in a network path based, at least in part, on said query context; send a policy decision query to one or more policy enforcement points associated with each corresponding network device in said network path; receive, from each policy enforcement point, one or more policy data records; concatenate each of said one or more policy data records from each of said policy enforcement points; and return the concatenation of policy data records.

In an embodiment, the policy trace logic is further configured to determine each network device in a network path based, at least in part, on said query context; send a policy decision query to one or more policy decision points associated with each corresponding network device in said network path; receive, from each policy decision point, one or more policy data records; concatenate each of said one or more policy data records from each of said policy decision points; and return the concatenation of policy data records to the requestor.

Figure 1A:
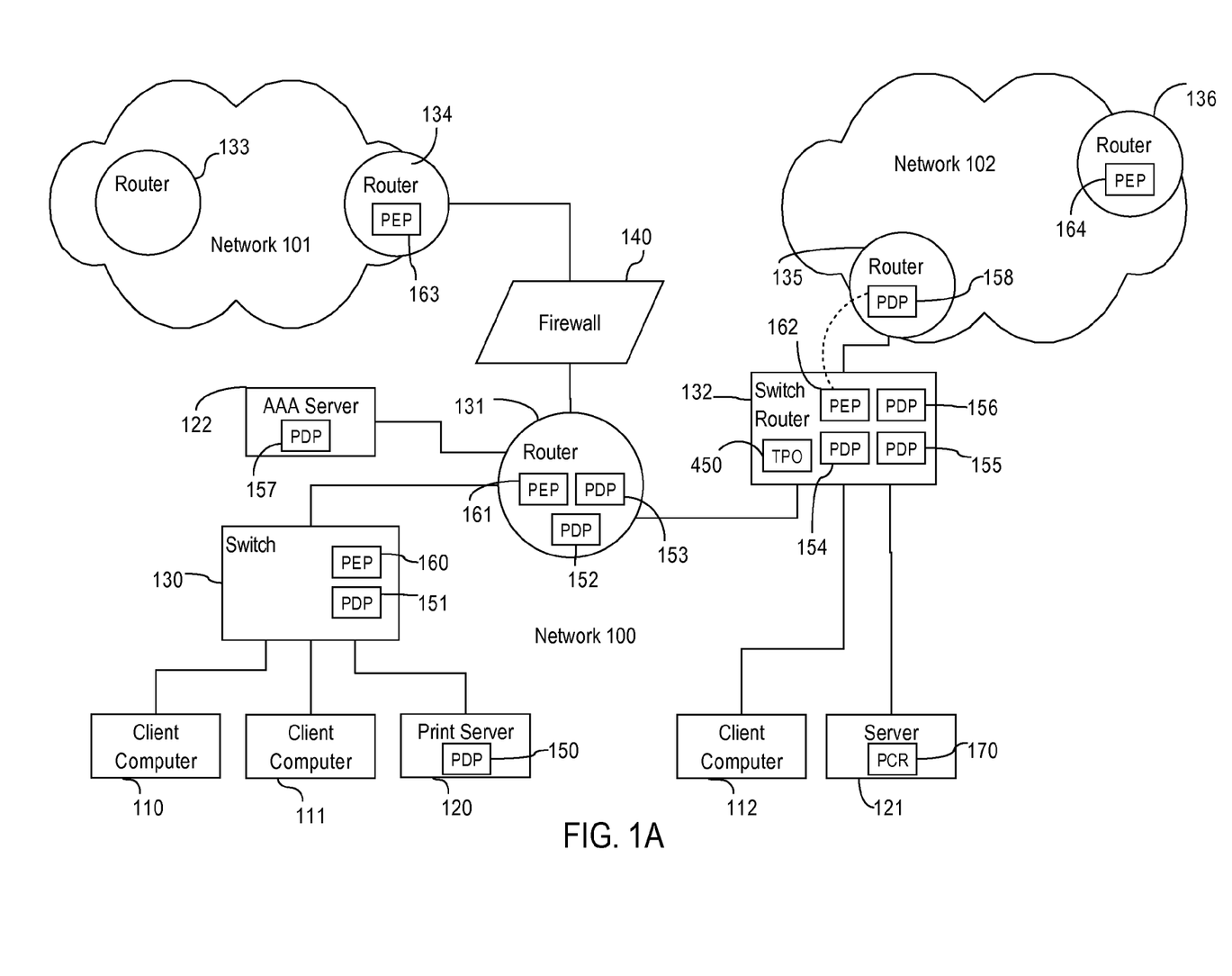
FIG. 1A illustrates a network on which an embodiment may be implemented.

In other embodiments, the invention encompasses a computer-readable medium configured to carry out the functions described above. In an embodiment, a data processing method comprises process steps 2.0 Structural and Functional Overview 2.1 Structural Overview FIG. 1A is a block diagram that illustrates a network 100 on which an embodiment may be implemented. Client computers 110 and 111, and print server 120 are coupled to switch 130, and subject to the policies and configuration of switch 130. Switch 130 and Authentication, Authorization and Accounting (AAA) server 122 are coupled to router 131, which is in turn coupled to firewall 140 and switch router 132.

Firewall 140 is coupled to router 134 in network 101, which also contains router 133.

Client computer 112 and server 121 are coupled to switch router 132, which is coupled to router 135 in network 102. Network 102 also contains router 136.

PEPs 160-164 and PDPs 150-158 each reside in one of the network devices of FIG. 1. The broken line arc between PEP 162 and PDP 158 indicates an association between these two entities.

For purposes of illustrating a clear example, FIG. 1A shows a limited number of client computers, servers, switches, routers, and other elements. However, in other embodiments, any number of such elements may be used.

The network devices interact with one another using packet switching and network protocols. Each network device may have one or more PEP (any of 160-164) or PDP (any of 150-158). In an embodiment, the same networking device or element may implement both PEPs and PDPs. PEPs and PDPs may serve as Policy Collection Points (PCPs) (any of 150-164) or Policy Query Points (PQPs) (any of 150-164).

A Policy data Collection Point, or PCP is any point at which data about the application of policies is collected. For example, a PCP may be a PEP or a PDP. An embodiment may, for example, use only PEP PCPs, while another embodiment may use only PDP PCPs. Further, an embodiment may use both PEP and PDP PCPs. In other embodiments, data collection at locations other than a PEP or PDP may be performed. These other locations are PCPs.

A Policy Query Point, or PQP, is any point at which queries may be received and processed. For example, PEPs and PDPs are capable of acting as PQPs. In an embodiment, a PQP may exist on an entity that is not a PEP or PDP.

A Policy Trace Orchestrator (PTO) 180 may exist on one or more network devices or computing systems.

Figure 1B:
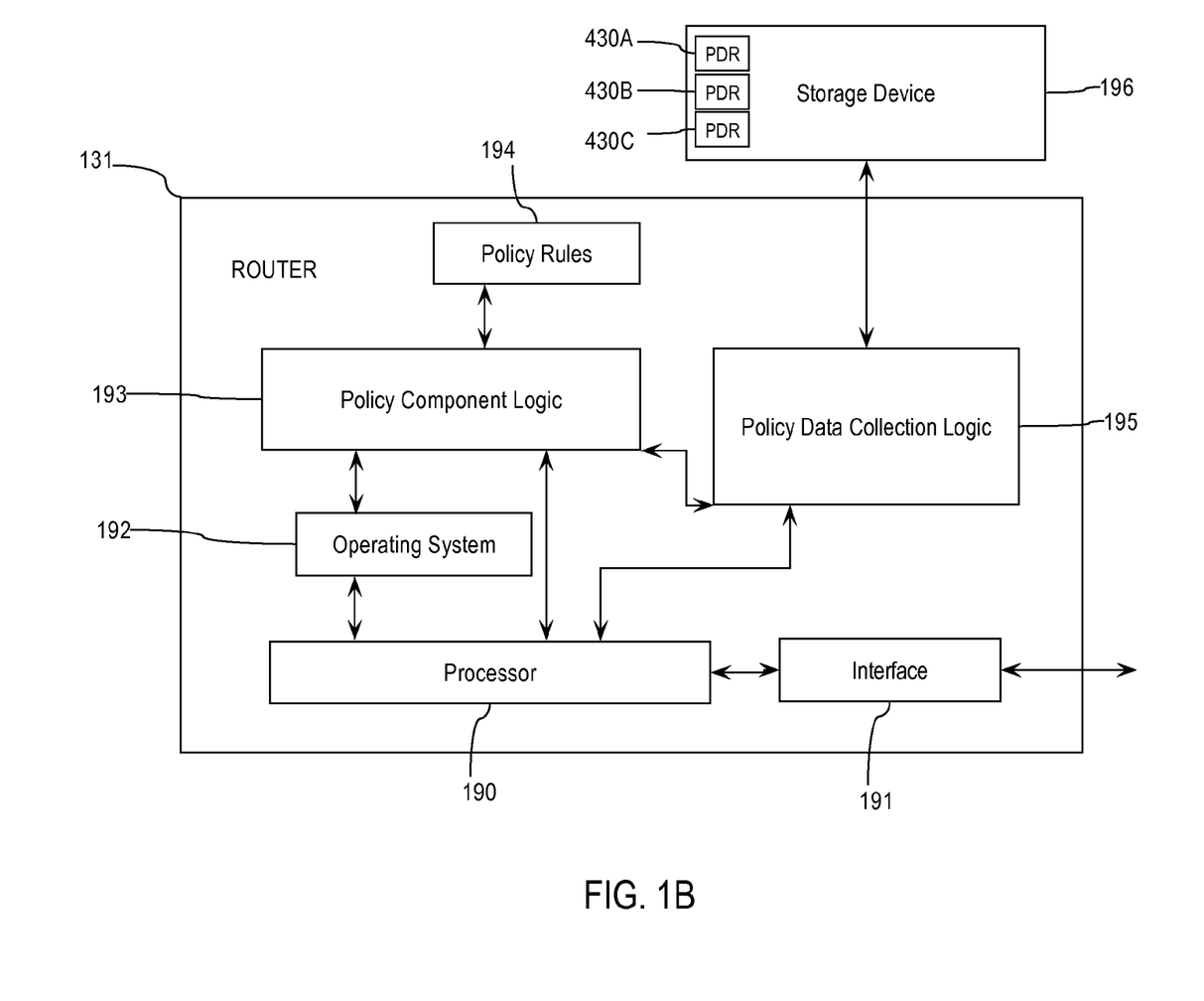
FIG. 1B illustrates a router on which an embodiment may be implemented.

FIG. 1B is a block diagram illustrating an example router 131 on which one or more PEPs and PDPs may reside. The router 131 comprises a processor 190 which is coupled to operating system 192, policy component logic 193, policy data collection logic 195 and interface 191.

Processor 190 may comprise one or more processors, and/or one or more processor cores. Operating system 192 comprises logic configured to manage memory, storage, input/output resources and devices, and application programs or other logical elements. In an embodiment, operating system 192 comprises Cisco IOS Software® commercially available from Cisco Systems, Inc., San Jose, Calif.

Policy component logic 193 inspects packets received through interface 191 and makes network policy decisions.

Policy data collection logic 195 creates policy data records 430A, 430B, and 430C and stores the policy data records in storage device 196.

Router 131 further comprises policy rules 195 coupled to policy component logic 193. Alternatively, policy rules 195 may be stored or hosted outside the router 131. Policy rules 195 provide decision making guidance for policy component logic 193.

Further, storage device 196, which is coupled to policy data collection logic 195 and contains Policy Data Records (PDRs) 430A, 430B, and 430C, is shown outside of the router 131 but may exist inside the router 131 and be a volatile or non-volatile storage device, memory, network attached storage, storage area network, or other storage unit. In various embodiments, the logical elements of FIG. 1B may be implemented on other than a router 131, such as on print server 120.

Figure 1C:
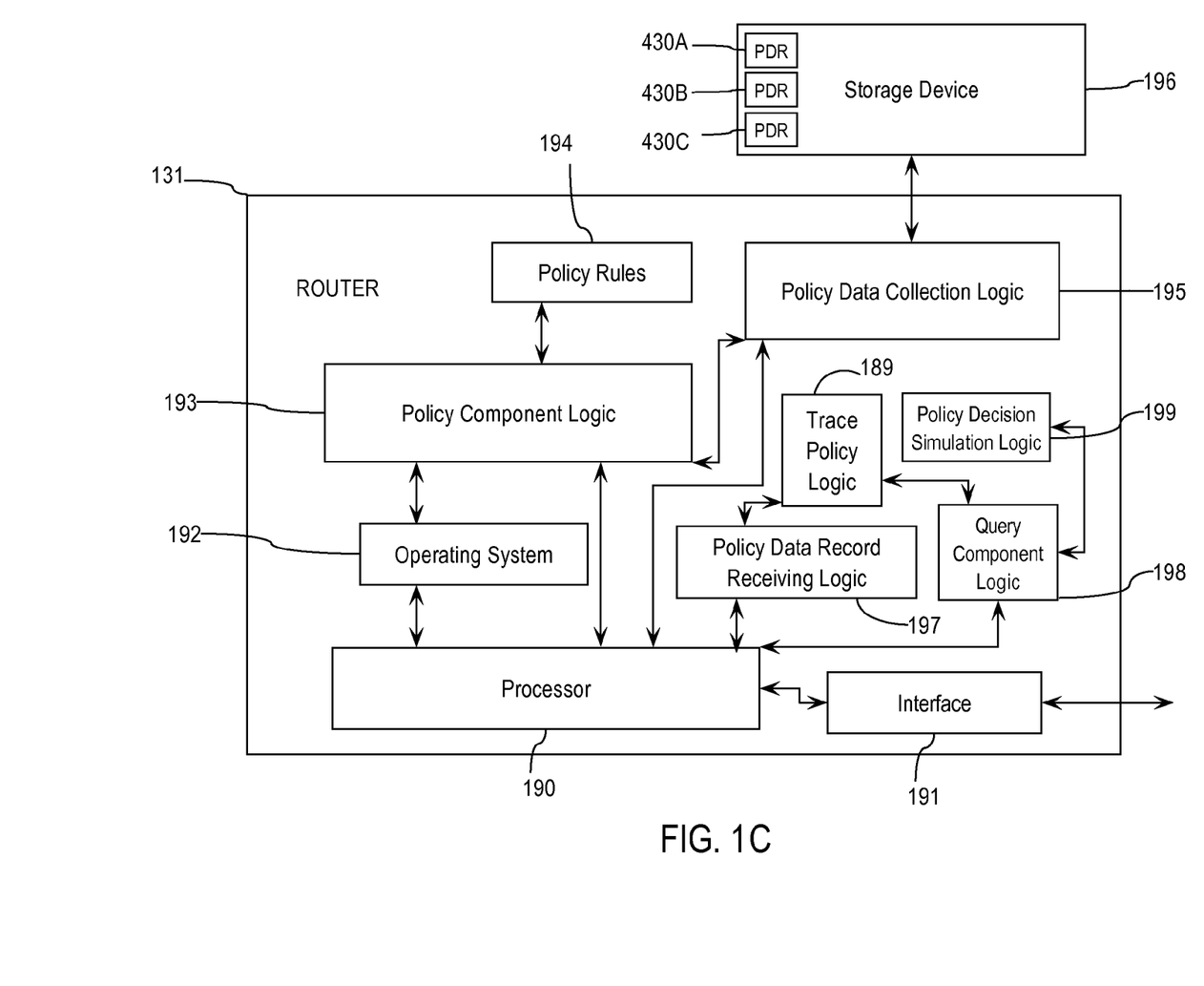
FIG. 1C illustrates a router on which an embodiment may be implemented.

FIG. 1C is a block diagram illustrating the router 131 of FIG. 1B, further comprising policy trace logic 189 and query component logic 198 coupled to the processor, and query component logic 198 coupled to policy trace logic 189 and policy component logic 193.

Query component logic 198 receives, via interface 191, a Policy Decision Query (PDQ) 410. In one embodiment, a PDQ 410 may comprise a query context that comprises hypothetical network state information. In an embodiment, hypothetical network state information may comprise hypothetical information about the state of interfaces, memory, and processors of selected network devices. In an embodiment, all state information associated with any network device may be considered for inclusion in hypothetical network state information.

Query component logic 198 is configured to process each PDQ 410, and pass the processed information to policy component logic 193. Policy component logic 193 is configured to determine which PEPs and PDPs to query based on the processed information from the PDQ 410. In an embodiment, only PEPs are queried. In an embodiment, only PDPs are queried. Policy component logic 193 is configured to issue one or more requests for policy decisions to PEPs and/or PDPs through query component logic 198. In an embodiment, requests for policy decisions are PDQs 410. Thus, query component logic 198 and policy component logic 193 may cooperate to enable the forwarding of a PDQ 410 to one or more policy record collection points.

Policy trace logic 189 receives PDRs 430A, 430B, 430C from interface 191. The PDRs 430A, 430B, 430C are received in response to the requests issued by the query component logic 198, and the records represent the results of policy decisions by the requested PEPs and PDPs. For example, three PEPs may receive a query forwarded by the policy component logic 193. These PEPs may query any associated PDPs, make policy decisions based on PDRs returned by the PDPs, and return policy decisions in the form of PDRs 430A, 430B, and 430C. Policy trace logic 189 may be configured to display, transmit, or otherwise transform PDRs 430A, 430B, and 430C. In an embodiment, policy trace logic 189 may be configured to cooperate with policy data collection logic 195 to store PDRs 430A, 430B, and 430C. In an embodiment, policy data collection logic 195 further comprises policy trace logic 189.

Figure 4:
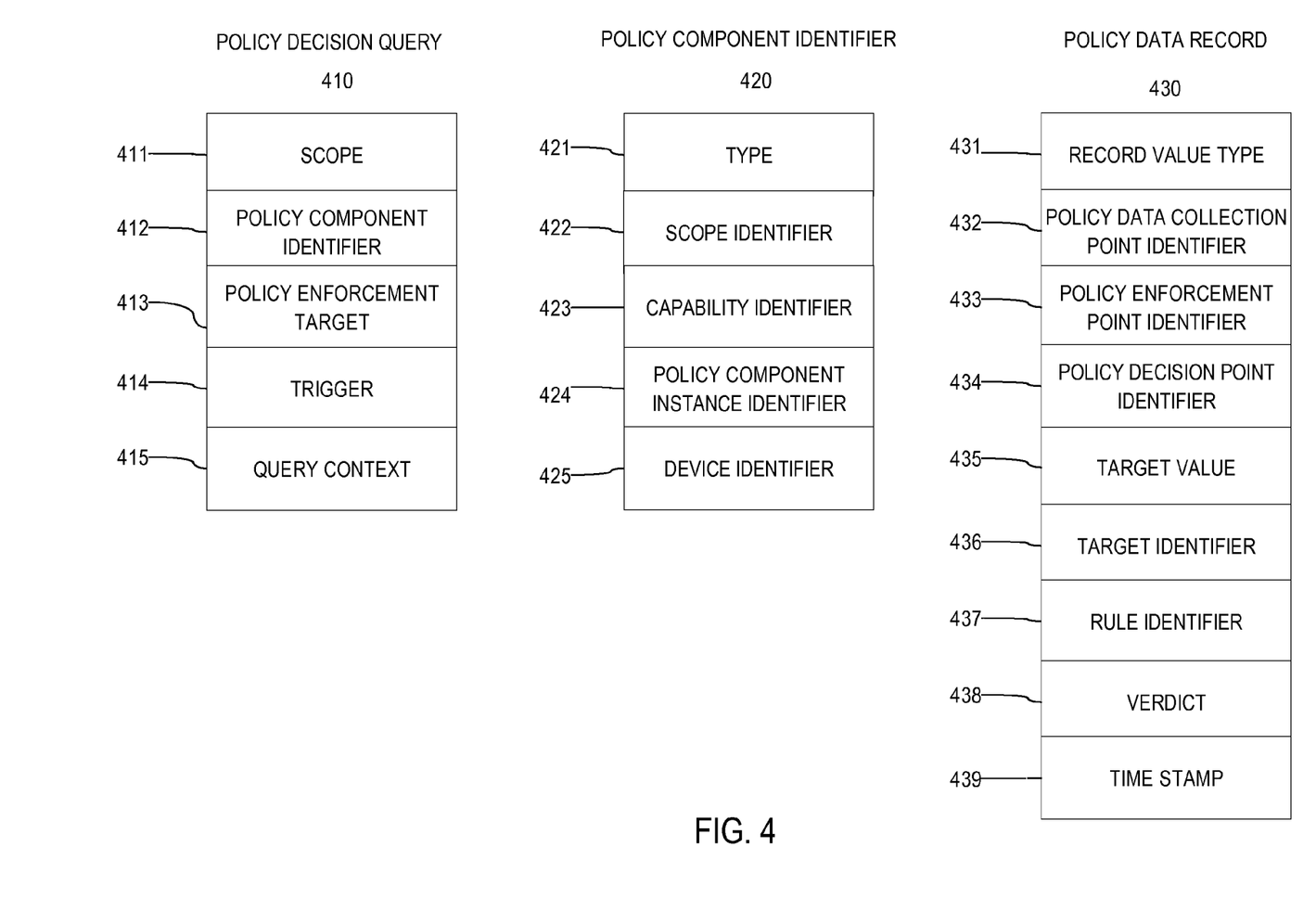
FIG. 4 illustrates an embodiment of a policy data query, an embodiment of a policy component identifier, and an embodiment of a policy data record.

FIG. 4 is a block diagram illustrating the format of an embodiment of a PDQ 410, a Policy Component Identifier (PCI) 420, and a PDR 430.

Policy Data Records

PDRs 430 serve as records of each policy decision that is made or could be made in a network, providing data indicating which policy decisions were made, by whom, and at what point in time. PDRs 430 may be collected at policy collection points (PCPs), each of which comprises a PEP or PDP. In one embodiment, each policy data record 430 comprises the following information:

PDR Type 431: Identifies the specific PDR format, depending on the type, scope and capability of the recording policy component.

PCP ID 432: Policy Component Identifier (PCI) 420 of the component recording the PDR.

PEP ID 433: PCI 420 of the component requesting and enforcing a policy decision.

PDP ID 434: PCI 420 of the component that made the policy decision

Target Value 435: Type of target. The list of target types is extensible; in an embodiment, target value 435 includes Packet, Flow, Session, and Event.

Target ID 436: Identifier of the specific target for which policies are being enforced. This ID is applicable to targets that have more than one packet associated, such as sessions and flows. The precise ID depends on the type of target. For example, in the case of a flow, a flow identifier will contain a particular ID.

Rule ID 437: Unique identifier for the policy rule that was enforced. A Rule ID may be a 32 bit value assigned by the PDP in order to reference the rule defined within the PDP. In one embodiment, a method for assignment of the Rule ID is to use a monotonically increasing number for each new rule. While a Rule ID may not always persist over time, it is possible for a management application or administrator to identify a particular rule, given a Rule ID and a point in time. To facilitate the interpretation of PDR data, consistent identifiers for policy components and devices may be used. A policy component may also record additional sophisticated information. For example, a PCP may record a sequence or chain of Rule IDs reflecting a plurality of successively fired rules that resulted in a verdict, instead of only the last rule that fired. In an embodiment, a transaction identifier is carried in the Rule ID field to reference a transaction or group of previous decisions that have been cached.

Verdict 438: The result of the firing of the rule. In an embodiment, the verdict is one in a set of enumerated values (e.g. access/deny); however the verdict may include parameter values returned as part of a verdict.

Time Stamp 439: Time stamp of the point in time the PDR is generated. A time stamp may be recorded in any format. For example, the time stamp may be recorded in RFC 3339 format.

Policy Component Identifiers

In one embodiment, in a PDR, each of the PCPs, PDPs and PEPs is uniquely identified by corresponding Policy Component Identifiers (PCIs) 420. In one embodiment, a PCI 420 is a 40 octet identifier, comprising the following fields:

Type 421: One octet indicating the type of component such as a PDP or PEP.

Scope ID 422: One octet, indicating the scope of the component. Examples of scopes include security, routing, and QOS. The scope provides a namespace for various components.

Capability ID 423: Two octets, indicating the specific capability within the particular scope. Examples include access control list and flexible packet matching.

Policy component instance ID 424: Four octets, indicating the specific instance of the policy component. An allocation scheme may be implementation specific.

Device ID 425: 32 octets, indicating the device on which the component is hosted. The device is generally identified by a Unique Device Identifier (UDI) such as a MAC address. If a device does not support a UDI, for example in the case of some Virtual Devices, another suitable identifier may be used that allows unique identification of the system hosting the policy component.

In an embodiment, a PDR may include the condition that led to the firing of the policy rule. In general, a receiving system may infer the condition that led to the firing of the rule by examining the rule, uniquely identified through PDP ID 434, rule ID 437 and the point in time (time stamp 439) at which the PDR 430 was recorded. In an embodiment, omitting the condition avoids encoding information that might be complex or have a variable length. For example, the information might involve excess network state and context information.

Some information in PDRs 430 may be redundant for any particular PCP. For example, the PCP ID 432 and PDP ID 434 will be the same for every PDR 430 recorded at a PDP PCP 434. By including this redundant information, no assumptions need to be made about where PDRs 430 will ultimately be processed.

In an embodiment, the format of PDRs 430 is optimized. For example, in general the PCP will coincide with a PDP or PEP, in which case it can be identified by just a few bits, e.g. "10" if the PCP-ID 432 is the same as the PEP-ID 433 and "11" if it is the same as the PDP-ID 434 (and, possibly, "00" if the PCP-ID 432 is included as a separate but optional field for those cases where the PCP is distinct from both PDP and PEP).

If storage efficiency is a concern, alternative embodiments may apply a template in which only some of the fields of PDRs 430 are stored. Information that would be common across PDRs 430 of a PCP (such as PDP ID 434 or PEP ID 433 of a PCP coinciding with that same PDP or PEP) might be kept separate from the PDRs 430 themselves.

The information in a PDR 430 is independent of a particular format. A PDR 430 may be stored, for example, as a file in CSV format, log file with a special log message for PDRs 430 defined (or several PDRs 430 in one log record), IPFIX extension stored as part of the Netflow cache and exported as part of a flexible Netflow data record, or an XML file.

Policy Decision Queries

A Policy Decision Query (PDQ) is a query, which when executed by the Policy Query Point (PQP) 132 receiving the query, causes a policy decision to be simulated. The PQP 132 returns a PDR, containing the information about the policy decision that would have ensued. The PQP 132 receives the query from a user and directs it at a policy component such as a PEP or PDP.

In an embodiment, one or more aspects of PDQs may be omitted to reduce the amount of required processing resources. For example, instead of requesting the decision to be made in the current networking context, as part of a PDQ, information about a "hypothetical" networking context may be supplied that to be considered when evaluating policy rules. A PDQ therefore allows for a "what-if" analysis, allowing a policy decision to be returned based on what decision would have been made under a certain condition or under present conditions.

As another example of an optional feature, query support by PEPs may be optional. Implementation of a query may comprise augmenting the communication mechanisms or interfaces between a PEP and PDP, for example, to indicate to the PDP that the decision request is in support of a PDQ, so that not just the verdict is returned but other information needed to construct the PDR that is returned in response to the query. In addition, in an embodiment, policy decision requests that are the results of PDQs are not logged separately as PDRs.

An embodiment of a Policy Decision Query may contain the following:

Policy Query Target 411: This identifies the policy component (or components) at which the query is directed. Unless otherwise specified, a PDQ has a specific scope so that the PDQ is directed at a particular policy component, identified by its PDP or PEP ID. However, in an embodiment, an optional convenience parameter allows a Policy Decision Query to be scoped at one of three levels.

In an embodiment, the optional Scope parameter is an enumeration of [Global|Specific|Group]. Specific (default) means: If selected, the Policy decision Query Point will send PDQ to a specific policy component specified in the request, identified by its PDP ID or PEP ID.

Grouped means: If selected, the Policy decision Query Point will send the PDQ to all policy components that are similar in function. For example, groups may include functional grouping such as security or load balancing.

Global means: If selected, the Policy decision Query Point will broadcast the PDQ to all policy components on the device and collect responses from each.

Policy Component ID (PDP ID/PEP ID): This is used in case of a scope of "specific", or absence of a scope.

Policy Enforcement Target 412: This identifies the "subject" on which policy is to be enforced, such as a flow. Includes a target type and a target identifier. An example target type may be "flow" while an example target identifier may be "flow identifier–Src/Dst IP+port, TOS".

Trigger 413: This identifies the trigger that causes a policy decision to be made. In many cases, the trigger will be implicit. For example, if a flow is observed, the trigger specifies whether the flow should be allowed or denied.

Event (the event that triggers a policy decision)

Query context 414: This contains hypothetical network state information used to override the actual current network state when evaluating policy conditions. This allows the requestor to simulate behavior that represents various scenarios of policy enforcement for the same target.

Collection of attributes (Interface, TOD, Bandwidth, or others; a supplied attribute overrides the corresponding current value).

Absence of supplied context implies the current device/network context is used.

In response to a PDQ, PDRs are generated and returned that reflect the policies and context at the time the request. Alternatively, PDRs may be stored or sent to another network device in response to a PDQ.

PDQs may differ based on whether the requestor is trying to simulate data path vs. control plane behavior. For example, PDQs issued to data path entities are simpler in nature since the target can be represented as one or more TCP/IP packets. On the other hand, layer 5-7 headers may be used if the query is targeted at Application Network services.

2.2 Functional Overview

Policy Data Collection Points

Policy information may be collected from PDPs and PEPs. Policy tracking information collected at the PEP results in creating and storing a policy data record 430 each time that a policy decision is requested from a PDP, recording the verdict and result received from the PDP in response. In contrast, policy tracking information collected at the PDP results in creating and storing a policy data record 430 each time that a policy decision is requested and a verdict is returned to the underlying PEP.

The information that can be collected in each case mirrors each other and is fundamentally equivalent. There may be, however, separate reasons to collect information at PEPs or PDPs. The same data fields apply, whether the PCP coincides with a PDP or PEP. Hence also the same data format applies to any PCP.

If a single PDP serves many PEPs, in an embodiment, PDPs may make more natural collection points to track policy than PEPs. Fewer data collection points may simplify managing collection and correlating data from different collection points.

A PEP PCP (a PEP acting as PCP) may record the instant in time when the policy decision is enforced, while a PDP PCP (a PDP acting as PCP) may record the instant in time when it makes and communicates the policy decision, not knowing if or when the decision will actually be enforced. If the time of actual enforcement is of particular concern in an implementation, then PEPs may be used as PCPs.

A PDP has no way of knowing if its decision is actually being enforced. As an example, a PEP may simultaneously send a request for a policy decision to multiple PDPs, and may receive conflicting verdicts in return. Generally, a receiving system may assume that a policy exists to resolve which PDP takes priority and overrides other PDPs, but such a resolution may not always occur in other embodiments.

When it is not clear which PDPs are associated with a PEP, applications may find it easier to deal with data collected from a PEP, which is then known to include all relevant decision information.

Policy Query Points

If a query that is sent to a PQP 132 is directed at or targets a PDP, the PQP 132 in effect assumes the role of a PEP that requests a decision from the PDP. It provides the same information that a PEP would.

The query might also be directed at a PEP. In this case, in response, the PQP directs a second query at a PEP. In response, the PEP is expected to redirect the query to its PDPs, which might not even be known to the PQP, and then return the result of how it would have enforced the corresponding query based on the responses of its PDPs.

In one embodiment, a PQP is implemented by every control and data path entity that contains policy components (PDP, PEPs).

Policy Component Registry

In an embodiment, a PQP may only support queries directed at PDPs. As a result, one policy decision query by itself may not disclose which policy would actually be enforced, as the same PEP might consult other PDPs that return different verdicts.

A reduced query allows identification of all PDPs that a PEP consults when enforcing policies. In an embodiment, identification of PDPs may be achieved by allowing queries against a policy component registry 170 which maintains a list of policy components (PEPs and PDPs) and associations of PEPs to PDPs. In an embodiment, a policy component registry 170 resides on server 121. In another embodiment, a policy component registry 170 resides on more than one server. In another embodiment, a policy component registry 170 may be a network appliance or other physical or logical machine capable of storing data and responding to queries.

3.0 Apparatus for Tracking Policy Decisions in a Network

3.1 Storing Policy Data Records

Figure 2:
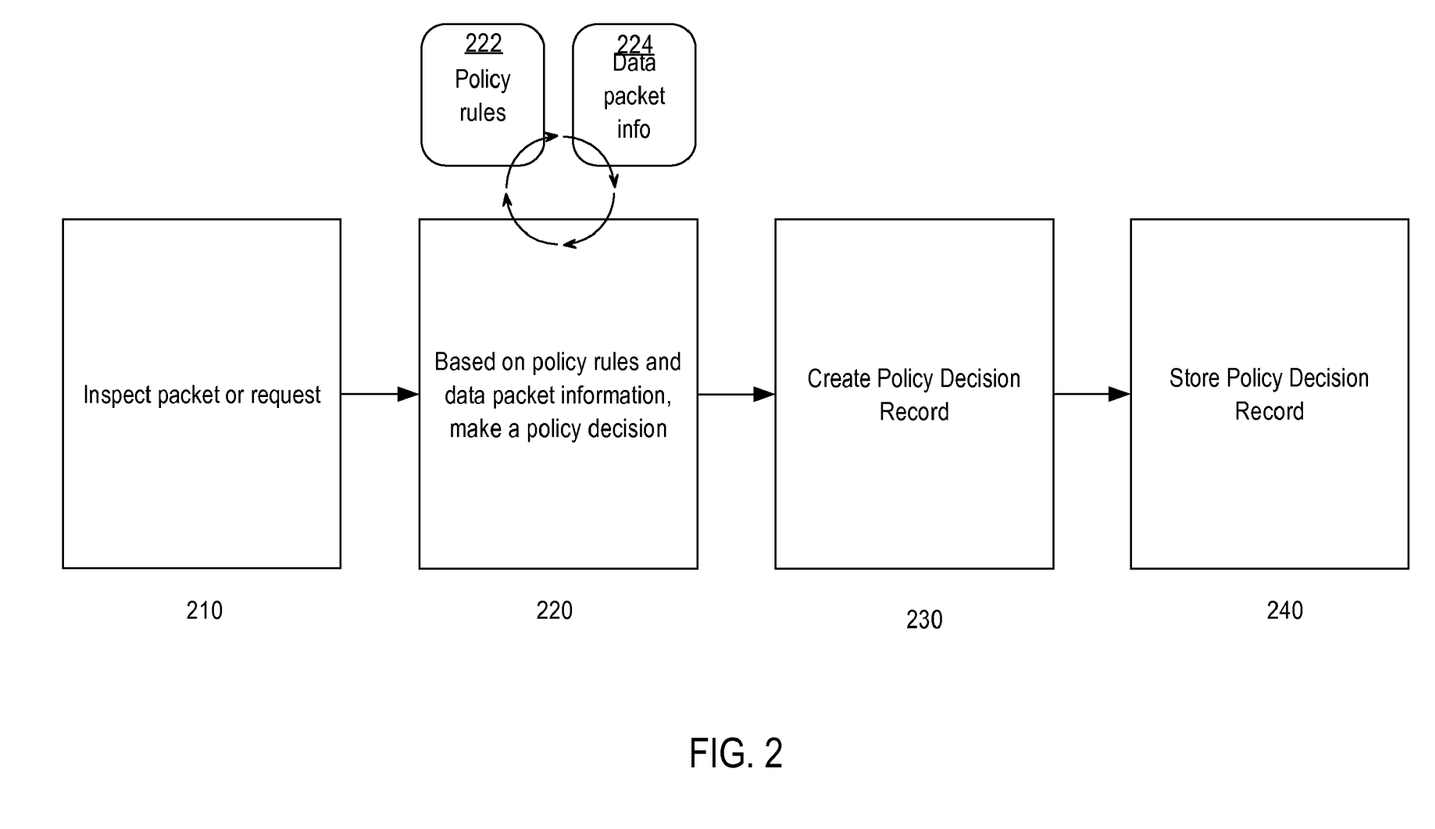
FIG. 2 illustrates a procedure for storing a policy data record.

FIG. 2 is a flow diagram illustrating an embodiment of a procedure for storing a policy data record. At step 210, a packet is inspected. For example, a PCP such as a PEP or PDP receives and inspects a data packet that is received from an interface 191.

At step 220, a policy decision is made based on policy rules 222, data 224 in the received packet, and context information 226. For example, based on policy rules 195, information contained in the data packet, and context information 226 such as network state information, the PCP makes a policy decision. Although FIG. 2 shows the use of policy rules 222, data 224, and context information 226 in making a policy decision, not all of these elements are required. Further, other considerations may be included within the policy decision making process.

At step 230, a policy data record is created. For example, the PCP creates a PDR 430.

At step 240, the policy data record is stored. For example, the PCP stores the PDR 430 in a storage device 196. By storing the PDR 430 in a storage device 196, a storage state of the storage device is transformed using the process herein, and a state of packet data is transformed. The packet data is used as a basis to create new data values in memory in the form of a PDR, which did not exist prior to such transformation, and then storing the PDR in a memory, or storage device such as disk storage. Thus, creating a policy data record at step 230 involves transforming a state of memory by changing the physical state of electronic gates that implement the memory, and storing a policy data record at step 240 results in transforming a state of the storage device 196 by, for example, changing the magnetic flux associated with particular sectors of a disk in the storage device. In at least these ways, the processes herein result in the transformation of an article from a first state to a different state. The same general kind of transformations occur in the process of FIG. 3, as further described herein.

In an embodiment, the PDR 430 that is stored at step 240 has the same format, regardless of which layer of the OSI networking reference model is associated with the target. For example, a PDR 430 that results from a policy decision regarding flow control is in the same format as a PDR 430 that results from denial of access to a particular server 121.

Although a PDR 430 conforms to a particular format, the format may be extensible. For example, a PDR 430 may contain more than one rule indicator 437 or identify a transaction involving a plurality of previously applied rules as discussed above. The PDR may further specify a condition of one or more packets that triggered the networking policy decision.

Components involved in a network transaction may also be identified by a component identifier 420.

3.2 Executing Policy Decision Queries

Figure 3:
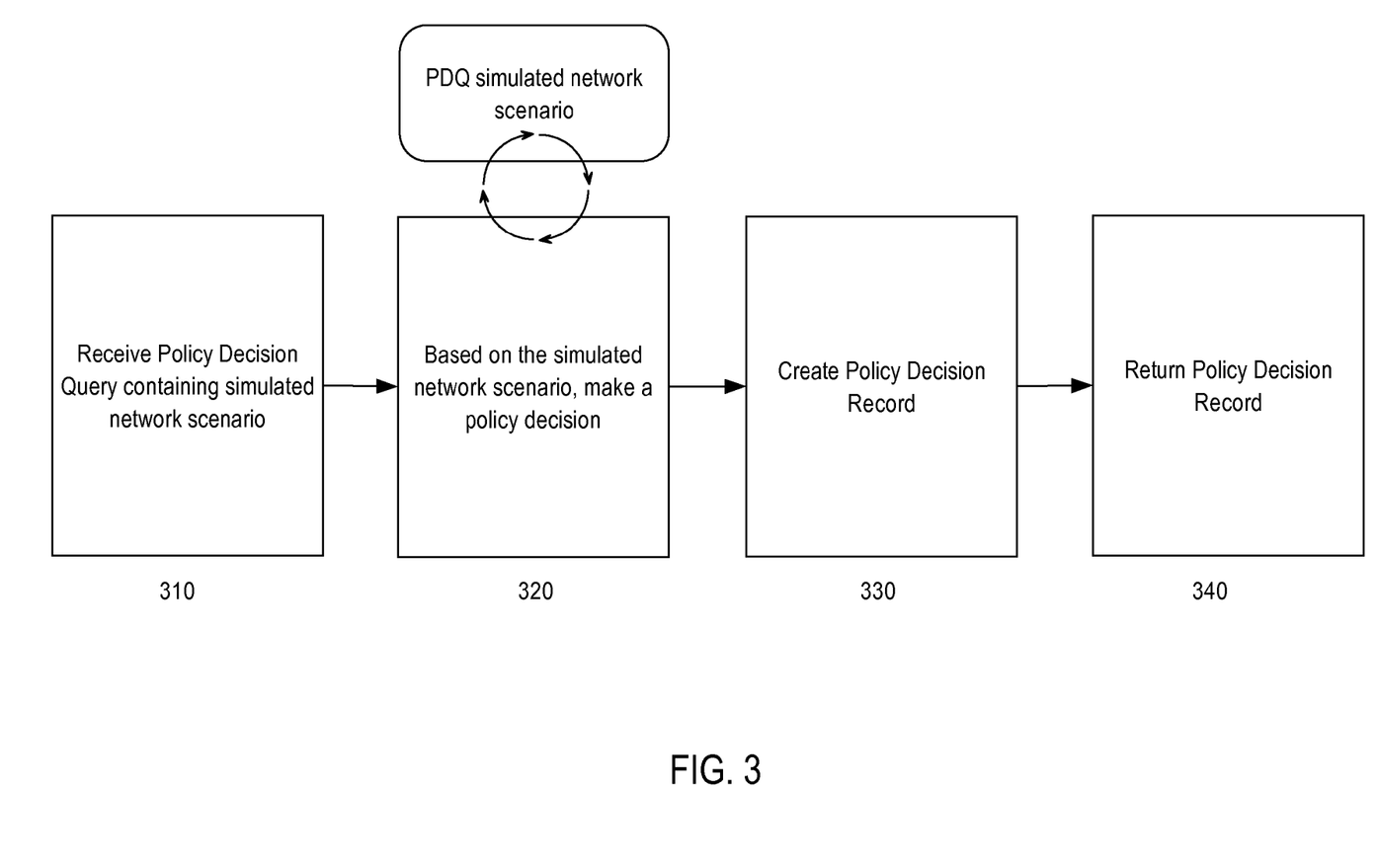
FIG. 3 illustrates a procedure for responding to a policy decision query.

FIG. 3 is a flow diagram illustrating a procedure for responding to a PDQ 410.

At step 310, a network element receives a PDQ containing query context information providing hypothetical network state information. The hypothetical network state information is used to simulate a network scenario and make a determination based on the simulated network scenario at step 320. At step 330, a policy data record is created. For example, a PDR 430 is created based on the decision. At step 340, the policy data record is returned. For example, the PDR 430 is returned to the requestor, which may be an application, network element, or other processing entity.

The decision making process is different for PDPs than it is for PEPs. In an embodiment, a PEP asks associated PDPs for a decision and makes a determination as to whether the decision will be enforced. A PDP responds with a determination.

A PQP may receive a PDQ 410, and forwards the query to the policy query target 411. If a PDP is the target, the query is forwarded to the PDP. The PDP makes a decision and returns a PDR 430 in response.

Figure 5:
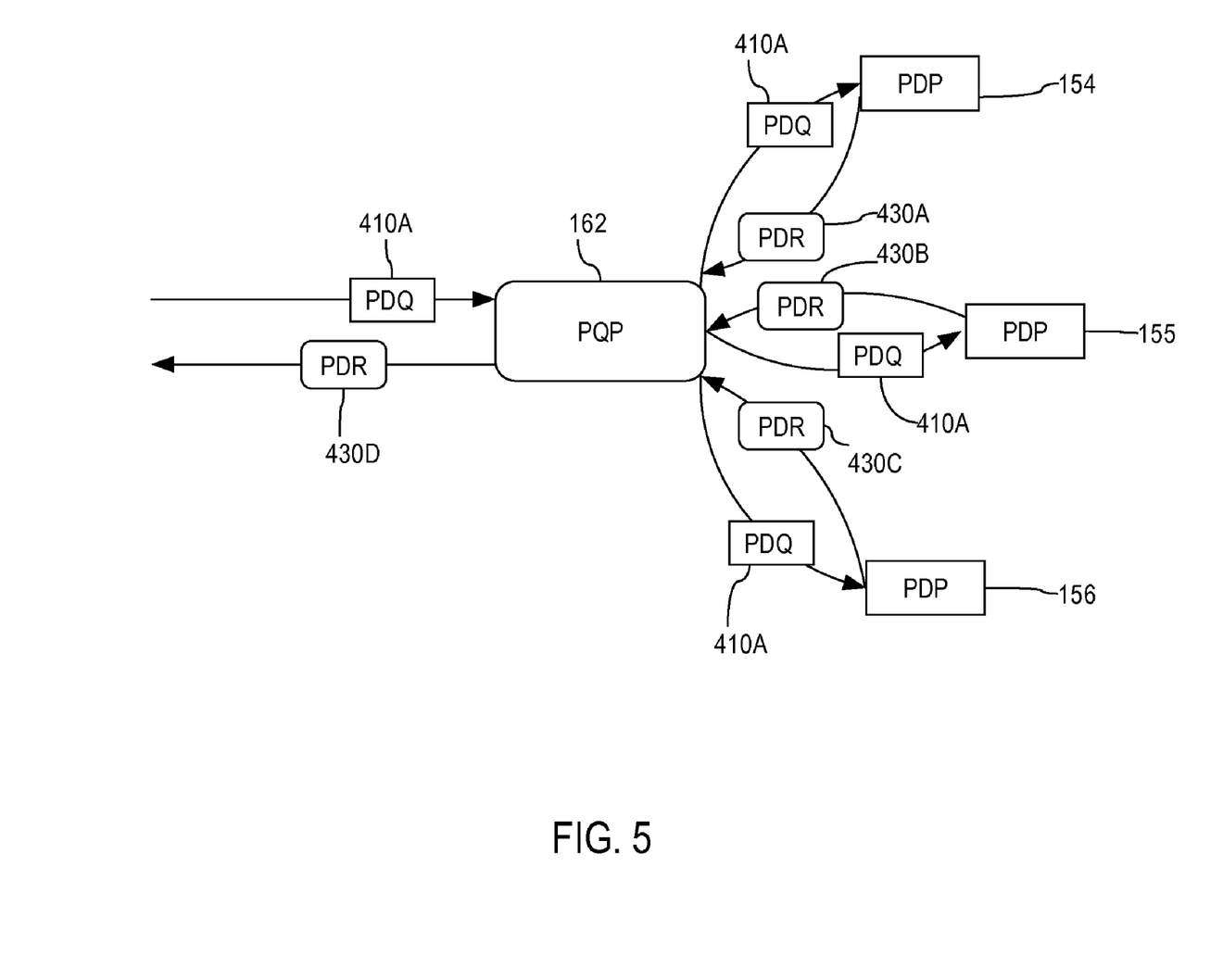
FIG. 5 illustrates a procedure for responding to a policy data query directed to a policy collection point based on an embodiment.

FIG. 5 is a diagram representing the process that occurs if a PQP receives a PDQ 410 that is directed to a PEP. PDQ 410A comprising a query context with hypothetical network state information is received by PEP 162. PEP 162 makes a determination that PDP 154, PDP 155, and PDP 156 are required to respond. PEP 162 forwards the PDQ 410A to PDP 154, PDP 155, and PDP 156. PDP 154 responds with PDR 430A. PDP 155 responds with PDR 430B. PDP 156 responds with PDR 430C. PEP 162 returns PDR 430D to the requester.

Policy Decision Queries 410 can be applied in many ways. For example, a PDQ 410 may be used to debug policies, by allowing issuance of "what-if" queries as shown above. A PDQ 410 also may be used to diagnose service problems, by allowing the reconstruction of a service scenario and identifying the individual policy decisions made and policies that are enforced.

A PDQ 410 also may be used to trace the enforcement of policies on a given service instance or an end-to-end flow. For example, a PTO 180 may implement a "tracepolicy" application that discovers the policies that are applied at each hop of a flow, similar to a "traceroute" that discovers the path across which packets traverse a network. In an embodiment, a tracepolicy application proceeds as follows:

1. Issue a request using the traceroute module of the operating system 192, or another networking application to discover the hops that are traversed by packets of a flow. Each of these hops potentially hosts a PEP that subjects the flow to policies.

2. For each hop, issue a PDQ 410 against its PEP. Alternatively, if the PEP does not support PDQs: Query each hop for its PDPs (as in some cases, the PDP 158 might be remote), and issue a Policy Decision Query against each of its PDPs.

3. Concatenate and return the resulting PDRs.

In one embodiment, a tracepolicy application may be implemented as part of operating system 192, or as a separate application program or module, or using firmware logic in a router 131 as shown in FIGS. 1B, 1C, or a combination of the foregoing approaches. Thus, the tracepolicy process as described herein may be tied to or implemented in a special-purpose computer.

Figure 6:
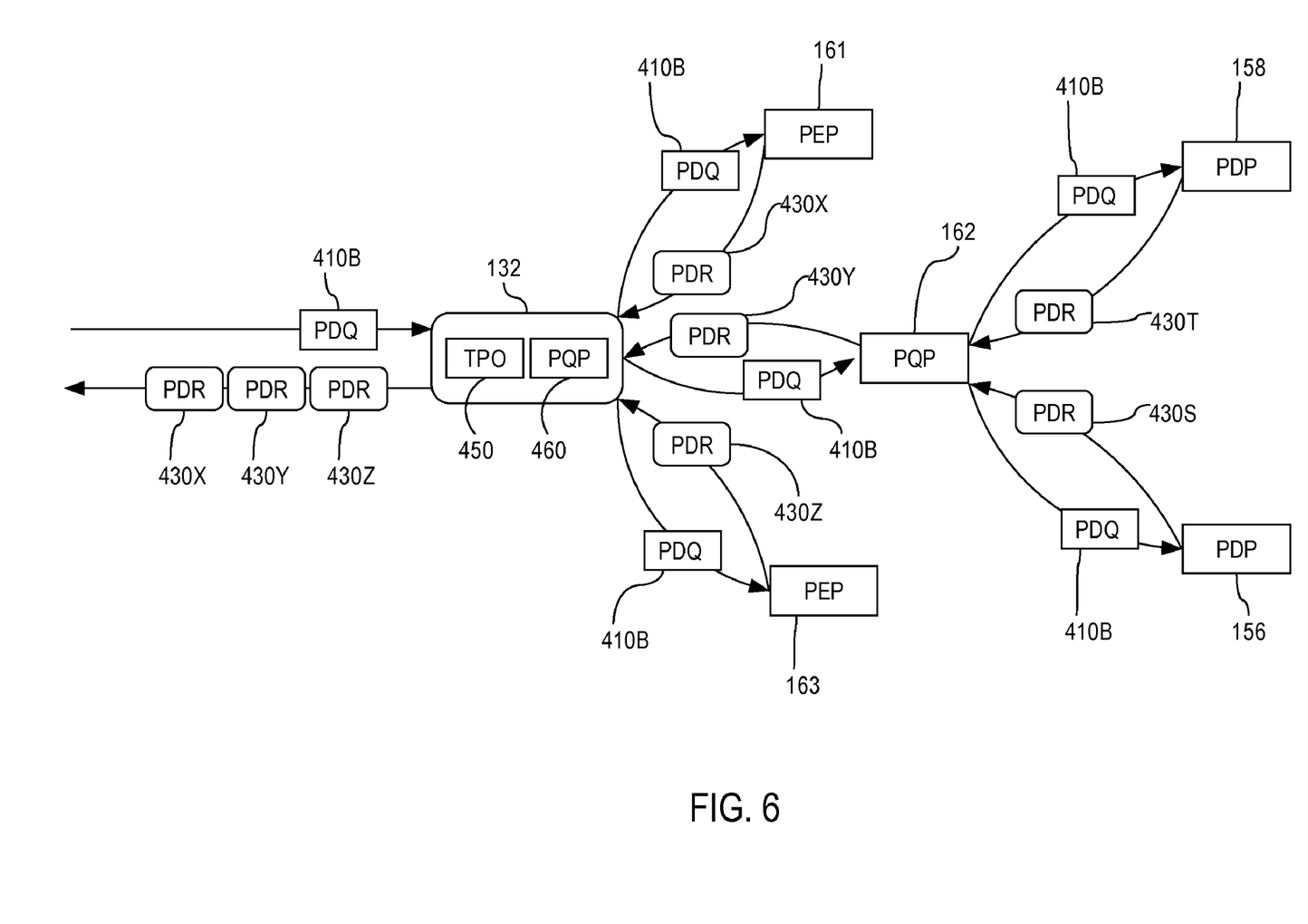
FIG. 6 illustrates a procedure for tracing policies on a network based on an embodiment.

FIG. 6 illustrates a procedure for responding to a trace query. A PDQ 410B containing a query context that invokes a trace query is sent to PQP 132. In response, PQP determines that PEPs 161, 162, and 163 are associated with one or more network devices in the network path in the query context. PQP 132 sends a PDQ 410B to each PEP. Each PEP in turn forwards the query to associated PDPs. For example, PEP 162 forwards PDQ 410B to PDPs 156 and 158. In return, PDPs 156 and 158 return PDRs 430S and 430T, respectively. PEP 162 returns PDR 430Y, representing the decision made by PEP 162 based on PDRs 430S and 430T. Although the same process occurs with PEPs 161 and 163, it is not shown. PEP 161 and 163 return PDRs 430X and 430Z, respectively. PQP 132 then concatenates and returns PDRs 430X, 430Y, and 430Z.

In an alternative embodiment, PQP 132 may determine PDPs associated with a network path in a query context. The PQP then queries PDPs instead of PEPs and collects, concatenates, and returns the resulting PDRs 430.

4.0 Implementation Mechanisms—Hardware Overview

Figure 7:
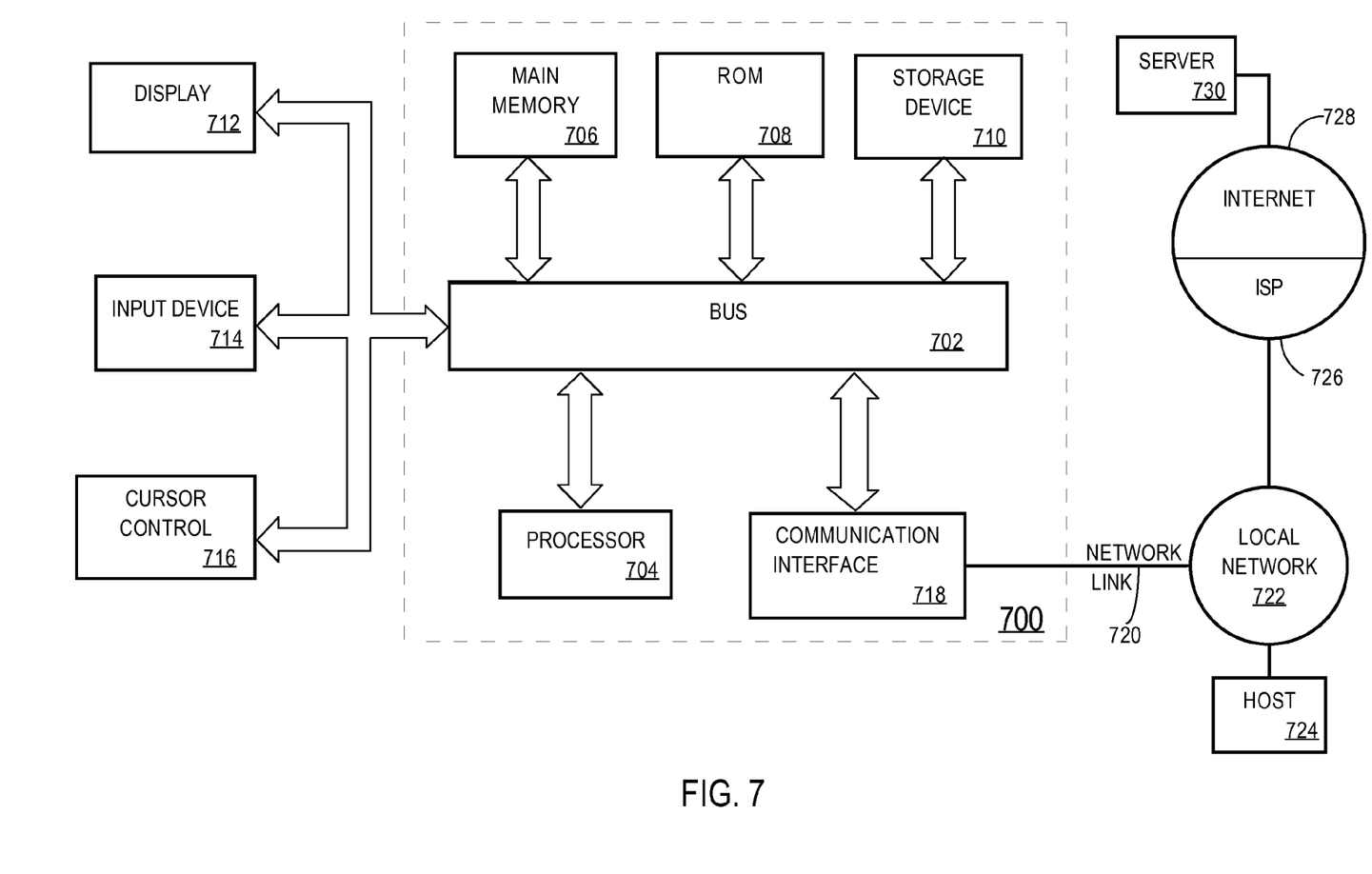
FIG. 7 illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is coupled to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing apparatus, comprising:
   policy component logic configured to:
      inspect one or more data packets which are received from one or more interfaces; and
      make a networking policy decision based, at least in part, on:
         one or more available policy rules; and
         information contained in the one or more inspected data packets;
   policy data collection logic coupled to the policy component logic and configured to:
      create one or more policy data records based, at least in part, on the networking policy decision;
      record, in each of the policy data records, one or more rule identifiers, wherein a rule identifier indicates a policy rule to be enforced; and
      store said policy data records, wherein each of the policy data records comprises data identifying the networking policy decision.

2. The apparatus of claim 1 wherein the policy data collection logic is configured to record, in each of the policy data records, data comprising:
   a record type value that identifies a format of the policy data records;
   a policy data collection point identifier that identifies the apparatus;
   a policy enforcement point identifier that identifies a first component that requested and enforced the networking policy decision;
   a policy decision point identifier that identifies a second component that made the networking policy decision;
   a target type value that identifies a type of the target of the networking policy decision;
   a target identifier that identifies the target of the networking policy decision;
   a verdict value that indicates a result of applying the one or more policy rules; and
   a time stamp indicating when the policy data record was generated.

3. The apparatus of claim 2, wherein the rule identifier further comprises a transaction identifier that identifies a transaction involving a plurality of previously applied rules.

4. The apparatus of claim 2, wherein each of the policy data records further comprises a condition value specifying a condition of the one or more data packets that triggered the networking policy decision.

5. The apparatus of claim 2, wherein each of the first component and second component is identified by a unique component identifier that comprises a type value, a scope identifier value, a capability identifier, a policy component instance identifier that uniquely identifies a particular instance of the component, and a device identifier.

6. The apparatus of claim 1, further comprising:
query component logic coupled to one or more processors and configured to receive, from a requestor via said one or more interfaces, a policy decision query comprising a query context which comprises hypothetical network state information;
policy simulation logic coupled to the query component logic and configured to:
make a policy decision based, at least in part, on said query context;
create the one or more policy data records based, at least in part, on the policy decision; and
return, to the requestor, the one or more policy data records associated with the policy decision.

7. The apparatus of claim 6 wherein the policy simulation logic is configured to provide in each of the policy data records one or more of:
a record type value that identifies a format of the policy data records;
a policy data collection point identifier that identifies the apparatus;
a policy enforcement point identifier that identifies a first component that requested and enforced the networking policy decision;
a policy decision point identifier that identifies a component that made the networking policy decision;
a target type value that identifies a type of the target of the networking policy decision;
a target identifier that identifies the target of the networking policy decision;
the rule identifier
a verdict value that indicates a result of applying the one or more policy rules; or
a time stamp indicating when the policy data record was generated.

8. The apparatus of claim 6, wherein:
policy configuration logic is further configured to determine that the policy decision query is directed to a policy enforcement point, and in response, to determine one or more policy decision points associated with the policy enforcement point; redirecting the policy decision query to each of said policy decision points; receive, as a response from each of said policy decision points, a policy data record; create a policy data record reflecting a decision based on said received policy data records; return said policy data record reflecting said decision.

9. A data processing apparatus, comprising:
one or more processors;
one or more interfaces coupled to the one or more processors;
query component logic coupled to the one or more processors and configured to receive a policy decision query comprising a query context which comprises hypothetical network state information from said one or more interfaces and to determine, based, at least in part, on said query, one or more policy record collection points;
policy component logic coupled to the query component logic and configured to forward the query to the one or more policy record collection points; and
policy trace logic coupled to the one or more processors and configured to receive one or more policy data records that describe one or more policy decisions based, at least in part, on said query context, performed by said one or more policy record collection points, and that comprise one or more rule identifiers, wherein a rule identifier indicates a policy rule to be enforced.

10. The apparatus of claim 9, wherein the policy decision query is made up of one or more of:
a policy query target identifier that identifies one or more policy components at which the query is directed;
a policy enforcement target identifier that identifies the subject on which the policy is to be enforced;
a trigger value, identifying an event that may trigger a policy decision; or
a query context identifying a hypothetical network state to be used for logically overriding the state of one or more network devices.

11. The apparatus of claim 9, wherein the query component logic is further configured to:
determine each network device in a network path based, at least in part, on said query context; send a policy decision query to one or more policy enforcement points associated with each corresponding network device in said network path; receive, from each policy enforcement point, the one or more policy data records; concatenate each of said one or more policy data records from each of said policy enforcement points; and return the concatenation of policy data records.

12. The apparatus of claim 9, wherein the query component logic is further configured to: determine each network device in a network path based, at least in part, on said query context; send a policy decision query to one or more policy decision points associated with each corresponding network device in said network path; receive, from each policy decision point, the one or more policy data records; concatenate each of said one or more policy data records from each of said policy decision points; and return the concatenation of policy data records to the requestor.

13. A non-transitory computer-readable medium carrying one or more sequences of instructions for processing policy based network related data, which instructions, when executed by one or more processors, cause the one or more processors to carry out the steps of:
inspecting one or more data packets which are received from one or more interfaces;
making a networking policy decision based, at least in part, on:
one or more available policy rules; and
information contained in the one or more inspected data packets;
creating one or more policy data records based, at least in part, on the networking policy decision; and
storing said policy data records in a volatile or non-volatile storage device, wherein each of the policy data records comprises data identifying the networking policy decision.

14. The non-transitory computer-readable medium of claim 13 further comprising instructions which, when executed by the one or more processors, cause the one or more processors to record, in each of the policy data records, data comprising:
a record type value that identifies a format of the policy data records;
a policy data collection point identifier that identifies the apparatus;
a policy enforcement point identifier that identifies a first component that requested an enforced the networking policy decision;
a policy decision point identifier that identifies a second component that made the networking policy decision;

a target type value that identifies a type of the target of the networking policy decision;

a target identifier that identifies the target of the networking policy decision;

a verdict value that indicates a result of applying the one or more policy rules; and a time stamp indicating when the policy data record was generated.

15. The non-transitory computer-readable medium of claim 14, wherein each of the first component and second component is identified by a unique component identifier that comprises a type value, a scope identifier value, a capability identifier, a policy component instance identifier that uniquely identifies a particular instance of the component, and a device identifier.

16. The non-transitory computer-readable medium of claim 13 further comprising instructions which, when executed by the one or more processors, cause the one or more processors to perform the steps of:

determine that the policy decision query is directed to a policy enforcement point;

in response to determining that the policy decision query is directed to a policy enforcement point, determining one or more policy decision points associated with the policy enforcement point;

redirecting the policy decision query to each of said policy decision points;

receiving, as a response from each of said policy decision points, a policy data record;

creating a policy data record reflecting a decision based on said received policy data records;

returning said policy data record reflecting said decision.

17. A non-transitory computer-readable medium as recited in claim 13, further comprising instructions which, when executed by the one or more processors, cause the one or more processors to perform:

receiving a policy decision query comprising a query context which comprises hypothetical network state information from said one or more interfaces and to determine, based, at least in part, on said query, one or more policy record collection points;

forwarding the query to the one or more policy record collection points; and receiving the one or more policy data records that describe one or more policy decisions based, at least in part, on said query context, performed by said one or more policy record collection points.

18. The non-transitory computer-readable medium of claim 17, wherein the policy decision query is made up of one or more of:

a policy query target identifier that identifies one or more policy components at which the query is directed;

a policy enforcement target identifier that identifies the subject on which the policy is to be enforced;

a trigger value, identifying an event that may trigger a policy decision; or a query context identifying a hypothetical network state to be used for logically overriding the state of one or more network devices.

19. The non-transitory computer-readable medium as recited in claim 13, further comprising instructions which, when executed by the one or more processors, cause the one or more processors to perform:

determining each network device in a network path based, at least in part, on said query context;

sending a policy decision query to one or more policy enforcement points associated with each corresponding network device in said network path;

receiving, from each policy enforcement point, the one or more policy data records;

concatenating each of said one or more policy data records from each of said policy enforcement points; and returning the concatenation of policy data records.

* * * * *